INVENTOR.
MILLARD F. SMITH
BY
Robert H. Ware
ATTORNEY

INVENTOR
MILLARD F. SMITH

BY *Robert H. Ware*

ATTORNEY

SPILL SENSORS

BACKGROUND OF THE INVENTION

Inadvertent petroleum spills and the release of floating industrial waste are causing increasing concern to industrial management personnel and to the general public. There is an urgent need for early warning of the initial presence of an unexpected and inadvertent petroleum spill or of the presence of floating industrial waste, sewage or other floating foreign matter on a body of water, to permit prompt action to eliminate the undesired condition of the water surface.

Early warning of a petroleum spill allows spill control booms, such as the booms shown in my U.S. Pat. Nos. 3,146,598 and 3,321,923, to be deployed around the spill, containing it within an enclosed area for skimming removal from the water surface. At the same time, prompt warning of the occurrence of an inadvertent petroleum spill allows the responsible personnel to stop the flow of petroleum immediately, and to take prompt action to locate and repair faulty equipment, apparatus, vessels or storage containers.

Prompt warning of the arrival of floating industrial waste at predetermined points on a body of water permits similar action to be taken by responsible personnel changing the operating conditions of manufacturing operations, waste treatment and discharge facilities or of chemical or waste storage equipment to eliminate these undesirable conditions immediately.

Public concern with water pollution and particularly with spilled petroleum, such as crude oil, "Bunker C" or other heavy grades of fuel oil, and spilled gasoline, kerosene or jet fuel from damaged tankers or ruptured hose lines, renders mandatory the installation of automatic, continuously operating sensor systems in petroleum port anchorages and harbors.

SUMMARY OF THE INVENTION

The systems of this invention employ floating sensing units deployed at one or more points in or around the periphery of the water surface area to be monitored. Each of these floating sensing units is provided with sensor devices responding to the presence of floating materials on the water surface, such as hydrocarbon films, chemical or sewage scum or similar floating material. Sensor signals indicating the presence of undesired floating materials on the water surface trigger an alarm or warning system, and may be delivered to a transmitter mounted in the floating unit and telemetered to a nearby central receiver, triggering a central alarm system and demanding immediate response to the condition reported by the remote sensor units. The optical and radio transmitting units mounted in each floating sensor device are preferably powered by solar cells charging compact storage batteries. A flashing beacon surmounting the floating unit guides nearby vessels to or around the device.

The sensing systems of this invention take advantage of the different spectral absorption and reflectance characteristics of the free surface of water and the free surface of a water borne film of hydrocarbon material or chemical waste, throughout the near infrared and infrared spectrums from 1 to 13 microns, particularly in the infrared spectrum at wavelengths at or below 2.8 microns, for example. Sea water absorbs incident infrared radiation, exhibiting reflectance of substantially less than 20 percent, and normally less than 2 to 3 percent, throughout the major part of the infrared spectrum. As a general rule, hydrocarbon films and floating chemical waste exhibit considerably higher reflectance and lower absorption than the free surface of pure water or sea water. Accordingly, the arrival of floating petroleum film or chemical waste scum drastically increases reflectance of radiation from the free surface, particularly in the band of infrared wavelengths at and below 2.8 microns, for example.

Taking advantage of this significant difference in reflectance characteristics, the sensor units of this invention incorporate a filter of material such as a thin sheet of translucent germanium exhibiting high absorption characteristics for most wavelengths of radiation impinging thereon and having a band-pass window or low absorption region in its radiation transmission spectral characteristic curve at a band of wavelengths centrally located in the infrared at the spectral region of interest. Mounted behind this absorption filter is an infrared-sensitive device such as a thermistor bolometer connected to produce an output signal in response to arriving infrared radiation reflected from the free water surface through the absorption filter to the bolometer. This output signal indicates that a film of foreign material having infrared reflectance characteristics significantly higher than those of sea water, is present on the water surface being monitored, thus providing a convenient and instantaneous indication of the presence of spilled hydrocarbons or other undesired floating material.

Local warning signals such as audible alarms or visible flashing light beacons may be mounted on each floating sensing unit.

Suitable pulse coded signals may be transmitted by the different transmitters of each of a plurality of sensing units in a given locality, indicating immediately through suitable receiver pulse decoding circuitry the identity and location of the individual sensing unit reporting the presence of undesired floating material, and thus permitting supervisory personnel to respond immediately, guided by full information about the location and extent of the pollution or spill.

Adjustable delay circuits eliminate premature alarm signals triggered by localized minor discontinuities, such as oil droplets from vessel exhaust systems, and sensitivity adjustments may be employed to initiate alarms only when spills of significant thickness are encountered.

Accordingly, a principal object of the present invention is to provide self-contained, long-lived, automatic systems and apparatus for monitoring the condition of the water surface of a designated body of water.

Another object of the invention is to sense and report the arrival and presence of floating foreign matter on the water surface such as spilled petroleum films, chemical wastes, sewage or the like.

A further object of the invention is to provide easily deployed floating sensing units having extended useful lives and self-sufficient power supply systems capable of monitoring and reporting water surface conditions effectively and reliably for long periods of time without maintenance or repair.

Another object of the invention is to provide sensing systems highly sensitive to the arrival and continuing presence of hydrocarbon films on the surface of sea water, taking advantage of the different infrared absorption-reflectance characteristics of pure sea water and of floating hydrocarbon films carried by a sea water surface.

Still another object is to provide monitoring systems of the above character incorporating telemetry equipment for central observation of sensing reports from numerous remote floating sensing units.

A further object of the invention is to provide such monitoring systems producing audible or visible alarm signals to report the scope and severity of a floating spill condition.

Other and more specific objects will be apparent from the features, elements, combinations and operating procedures disclosed in the following detailed description and shown in the drawings.

THE DRAWINGS

SHORE BASED RECEIVER

The central control and indicating unit employed in the systems of the present invention is a telemetry receiver stationed on shore near the harbor area monitored by the system, at a point convenient to the supervisory personnel responsible for dealing with spilled crude oil, fuel oil, gasoline or other petroleum products, or with spilled industrial wastes, sewage or other water pollutants.

Figure 1:
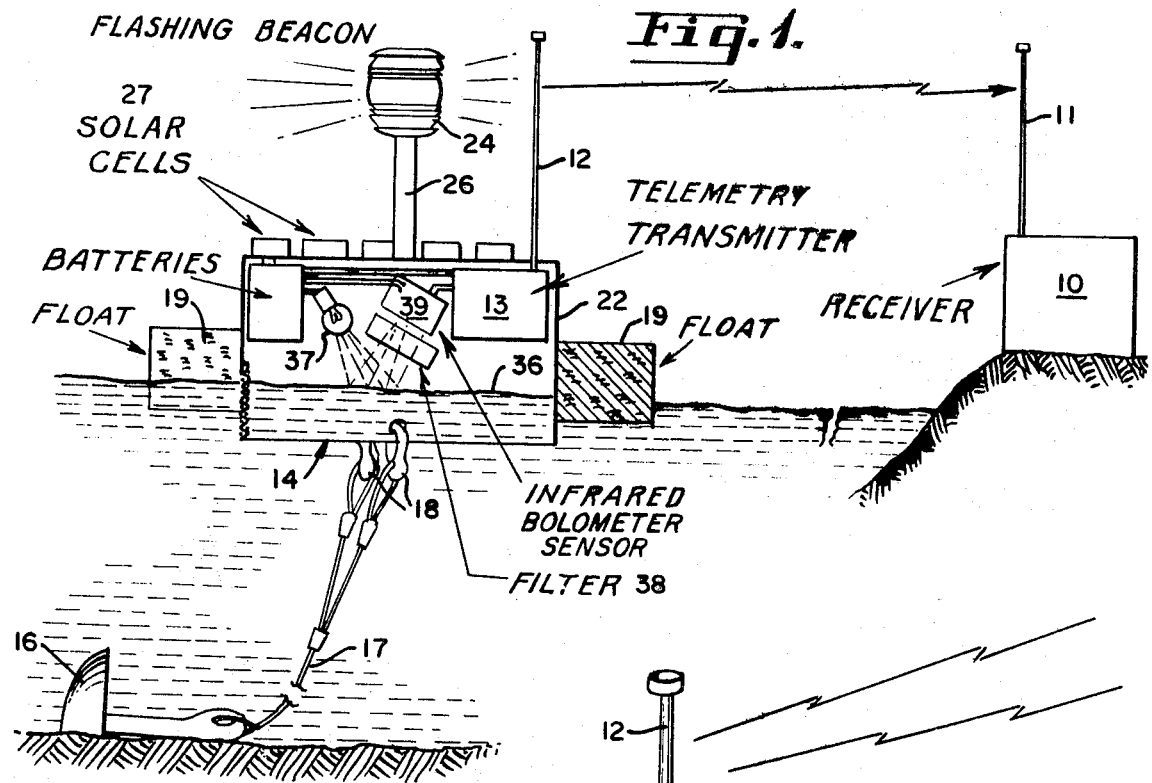
FIG. 1 is a schematic elevation view of two separate portions of the sensing systems of this invention, showing a floating sensor unit deployed on a body of water and connected by telemetry to a receiver positioned on shore.

This telemetry receiver 10 is shown schematically in FIG. 1, and is provided with a receiving antenna 11 preferably positioned in line of sight relationship with a transmitting antenna 12 extending upward from a telemetry transmitter 13 incorporated in each of a plurality of floating sensing units 14 deployed on the water surface being monitored at predetermined positions in or around the periphery of a harbor region to be observed.

FLOATING SENSOR UNITS

As indicated in FIG. 1, each sensor unit 14 is secured by suitable ground tackle, such as the mushroom anchor 16, the anchor rode 17 and the shackles 18 secured directly to the body of the sensor unit 14. Anchor cable 17 is of sufficient length to compensate for all anticipated water level changes due to tides or local flooding conditions, and it provides the necessary scope to maintain the sensor unit 14 on station while providing sufficient extra cable length and sag at the lower end of cable 17 to assure that wind and sea conditions do not cause the sensor unit to be tumbled or tossed to such an extent that anchor cable 17 is stretched tight, uprooting and dragging anchor 16 off station.

Figure 2:
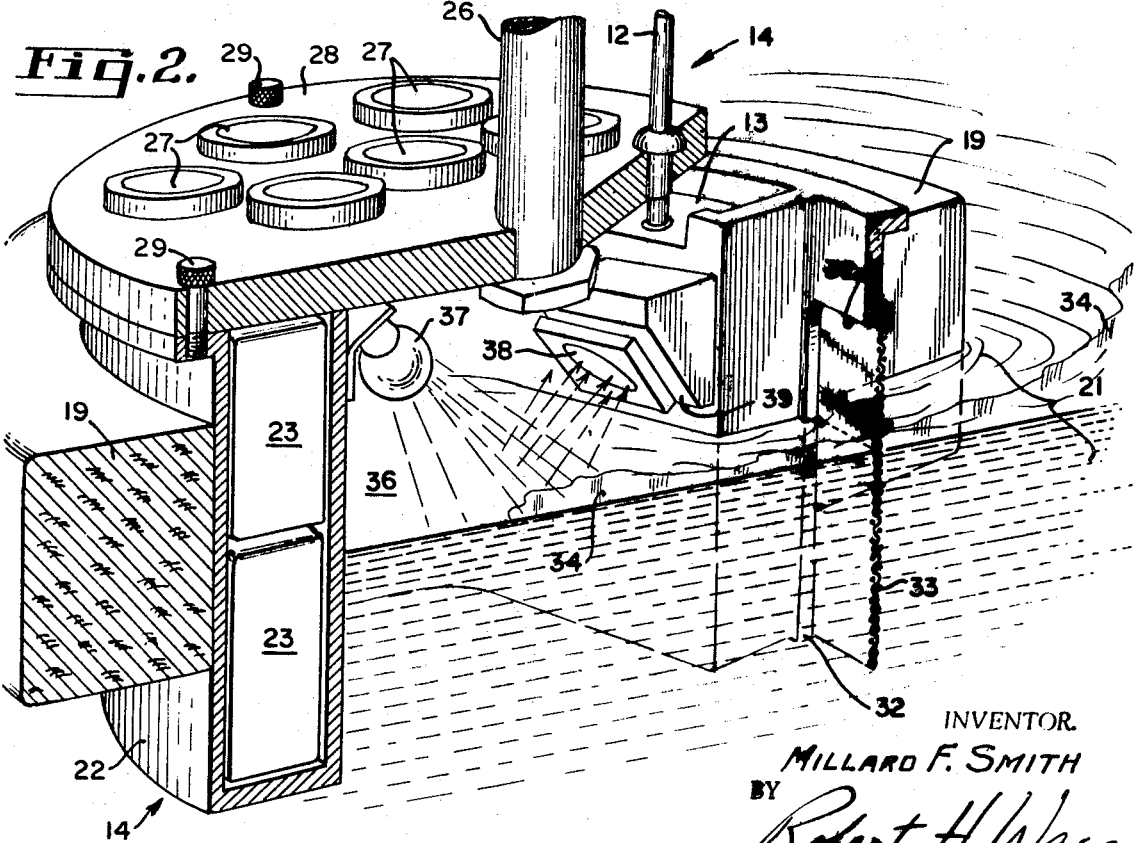
FIG. 2 is a diagrammatic cutaway perspective view showing a floating sensor unit of the present invention.

A ring-shaped float 19 surrounds the sensor unit 14, as shown in FIGS. 1 and 2, and the float 19 is provided with one or more cutaway entrance aperture sectors 21 at one or several points around the periphery of float 19, providing access to the interior of sensor unit 14. A generally annular hull portion 22 formed of a sea water resistant material such as cast aluminum or molded polyethylene, polyvinyl chloride or other suitable polymers, forms the main shell of the sensor unit 14 being positioned just inside the ring-shaped float 19. The float 19 is preferably cemented to the external periphery of the shell-like hull 22.

A continuous hollow, annular chamber or a series of one or more irregularly shaped hollow regions are preferably formed within hull 22, providing storage space for storage batteries 23, telemetry transmitter 13 and associated pulse coding circuitry, and pulse switching circuitry controlling the operation of a slow flashing navigation beacon 24 installed surmounting a suitable column 26 positioned centrally atop sensing unit 14, as well as other necessary wiring and circuitry associated with a plurality of solar cells 27 arrayed across the top of a cover plate 28 secured by such means as screws 29 to an upper flange 31 formed on the shell-like hull 22.

While different arrangements and configurations of the various features incorporated in the sensor unit 14 may be employed as desired, the general shape and geometry illustrated in FIG. 2 has been found to be suitable from a number of practical standpoints. For example, use of the generally cylindrical shell 22 with a diameter somewhat greater than its height surrounded by the extremely lightweight buoyant ring-shaped float 19 provides stable floating buoyancy for the sensor unit 14, taking advantage of the displacement of the hollow shell-like hull 22. Tilting or listing caused by wind or waves is counteracted by the natural, inherent buoyancy of hull 22. The ring-shaped buoy 19 mounted surrounding the periphery of the hull 22 contributes great additional buoyancy when tilting or listing of the unit tends to submerge a low portion of the ring-shaped buoy 19. Accordingly sensor units 14 of the shape illustrated in FIG. 2 are practically impossible to capsize, particularly in view of the righting moment provided by the ring-shaped buoy 19 cooperating with the anchor cable 17.

Furthermore, the cover plate 28 shielding the water surface inside the generally circular hull 22 from external illumination permits the infrared sensing units installed within hull 22 to operate effectively regardless of external conditions of natural or artificial illumination, such as daylight, sunlight, lightning, searchlights or any other sources of external radiation.

The hull 22 is preferably provided with one or more access portals 32 passing radially therethrough, aligned with the apertured sectors 21 of float 19 and connecting the interior region enclosed by hull 22 with the outside atmosphere and the surrounding sea surface. Each portal 32 may be protected by a suitable screen 33 or by rods, grill work or any other protective means desired to keep sticks, paper and other floating debris from entering portal 32, while permitting the sea surface to form an uninterrupted continuum extending from outside directly inside the cavity within hull 22. By this means, an oil film 34 deposited on the sea surface outside the sensor unit 14 and advancing toward unit 14 enters portal 32 and floats on the sea surface 36 inside the enclosure of hull 22. Localized spots of surface film or scum are normally carried away through an opposite portal 32 by the action of wind or current.

INFRARED REFLECTANCE CHANGE DETECTORS

Positioned beneath cover plate 28 is a radiation source to direct radiation toward the sea surface 36 inside hull 22. This radiation source may be a simple incandescent electric bulb 37. For extra reliability, long-life bulbs or a plurality of such bulbs may be employed to assure continuous radiation falling on the surface 36. Conventional, inexpensive, incandescent electric lamps are quite suitable for supplying the desired radiation since these lamps normally deliver a large percentage of their radiant energy output in the infrared region of the spectrum. If desired, a low-drain pulse lamp may be used, with a repetition rate of 20 Hz. for example, further reducing the power consumption of the radiation source.

A large portion of the radiation falling upon surface 36 from the radiation source 37 is absorbed by the sea water underlying surface 36. A small part of the incident radiation, and a particularly small percentage of the radiation having wavelengths falling within the infrared wavelength region, is reflected by surface 36 toward the sensor assembly, which comprises a filter 38 and a bolometer 39.

The filter 38 is positioned to intercept reflected radiation proceeding from water surface 36 toward bolometer 39. Optical alignment of these units along an optic axis is not essential, however, since specular reflection is not required in the units of this invention, and wave formation, ripples and other disturbances of surface 36 do not adversely affect the operation of these devices. Accordingly divergent and convergent rays of reflected radiation are illustrated in FIG. 2, directed toward and arriving at filter 38 as they travel toward bolometer 39. If desired a screen or baffle may be interposed between lamp 37 and the sensor assembly of filter 38 and bolometer 39 to block direct radiation travelling from the source 37. Alternatively, as shown schematically in FIG. 1, the lamp 37 may be positioned beside the filter and bolometer sensor assembly, which therefore do not face the source 37 and are thus incapable of receiving direct radiation therefrom.

Figure 3:
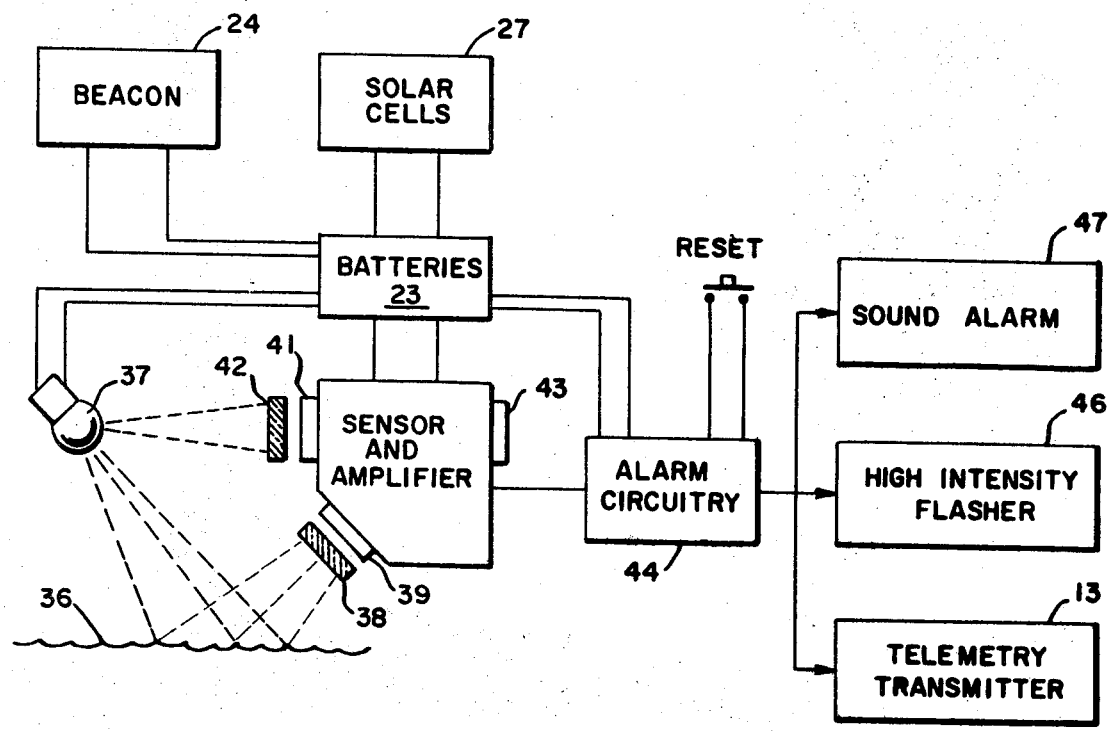
FIG. 3 is a schematic circuit block diagram of a preferred form of electrical circuitry incorporated in the floating sensor unit of FIGS. 1 and 2.

A different configuration of radiation sensors is shown schematically in FIG. 3, where duplicate lead sulfide radiation detectors are employed for self-compensation purposes. In FIG. 3, detector 39 receives radiation reflected from surface 36 passing through filter 38 in the manner described above. A similar comparison detector 41 faces source 37 and receives radiation passing directly therethrough through a filter 42. A third compensator detector 43 is shielded from all direct radiation, but is exposed to the same ambient temperature and atmospheric conditions as detectors 39 and 41. Compensator detector 43 thus automatically provides a reference output voltage to be matched with that of sensor detector 39 to provide good temperature stability over a wide range of operating temperatures. To provide automatic gain control, detector 43 preferably is mounted on the same heat sink as detectors 39 and 41.

Comparison detector 41 likewise provides temperature stability, and also provides a matching reference voltage proportional to the actual emitted radiation from lamp 37, thus compensating for fluctuations in lamp filament voltage or brightness. By matching detectors 39 and 41 in a suitable bridge circuit, with zener diode voltage regulation extremely small fluctuations of detector 39's output voltage may be sensed and amplified in order to signal with extreme sensitivity the presence of small amounts of floating films having absorption-reflectance characteristics different from those of water.

Suitable optical attenuators interposed at filter 42 or other sensitivity adjustments permit the alarm threshold of the system to be adjusted as desired. Suitable delay circuits may be incorporated in the alarm circuitry to assure that small localized passing droplets or patches of floating film do not actuate the alarm signals.

Any preselected band of infrared wavelengths typified by absorption-reflectance differences between sea water and floating films of subject pollutants may be employed in the systems of this invention.

Filter 38 is selected for its low absorption characteristics over the infrared radiation wavelength spectral region of interest. It may be a germanium filter with a passband of wavelengths falling at or below the neighborhood between 1.9 and 2.04 microns, for example, and filter 38 absorbs all or a major part of the radiation reflected from surface 36 and falling on filter 38 having other wavelengths falling in the visible or ultraviolet regions of the spectrum. Since surface 36 reflects very little of the incident infrared radiation having wavelengths within the passband of filter 38 when it is the free surface of substantially pure sea water, very little radiation in this wavelength region reaches filter 38. Accordingly very little radiation within this wavelength region reaches infrared detector 39 behind filter 38 when surface 36 is a surface of substantially pure sea water.

When a floating oil film 34 constituting the arriving edge of an oil slick or petroleum spill reaches sensor unit 14 and enters portal 32, this oil film 34 drastically changes the absorption-reflectance characteristics of surface 36. Since oil film 34 has a far higher reflectance than does water for radiation in the subject infrared radiation wavelength region, between 1.9 and 2.04 microns, for example, oil film 34 reflects substantial portions of the incident radiation having these wavelengths. The presence of oil film 34 thus significantly increases the amount of radiation in this passband arriving at filter 38 and passing therethrough to reach bolometer 39.

Accordingly, the presence of oil film 34 within the interior cavity of hull 22 immediately causes a significantly increased amount of infrared radiation to reach detector 39, producing a corresponding output signal from detector 39 in response to this radiation. The signal from bolometer 39 actuates alarm circuitry 44 (FIG. 3), and may trigger a warning flasher beacon 46 which is brighter or quicker than beacon 24, or an audible sonic alarm 47.

If preferred, alarm circuitry 44 may actuate telemetry transmitter 13, producing a suitably pulse coded signal to identify the particular sensor unit 14 responding to the presence of oil film 34, identifying itself and indicating the presence of floating oil or other undesired floating materials having different reflectance characteristics than does substantially pure sea water. The telemetry signals from transmitting antenna 12 are received at receiving antenna 11, and receiver 10 responds thereto in accordance with its predetermined response program illuminating signal lights, initiating alarm systems or otherwise providing indications facilitating prompt countermeasures to eliminate the undesired floating material whose presence has just been signaled by the monitoring sensor unit 14 from which this signal has been received.

Different pulse codes for the transmitters of different sensor units 14 comprising an array of sensors surrounding a monitored area permit the decoding circuitry in receiver 10 to identify the location of the advancing edge of the oil slick or other undesired floating materials in terms of these predetermined monitoring positions, thus providing automatic and instantaneous warning indications of the presence, scope, extend and direction of movement of petroleum spills or other undesired floating materials.

The power supply system comprising solar cells 27 providing electrical energy in response to the incident sunlight, cooperating with storage batteries 23, provides ample energy for the operation of the radiation source 37, the infrared sensing circuitry associated with bolometer 39 and the telemetry transmitter 13, as well as the flasher pulse circuitry and illumination energy required for flashing beacon 24, which may be turned off by automatic photocell means during daylight if desired. Passive radar warning for informing approaching vessels of the presence of sensor unit 14 may be provided by an internal corner "cube" radar retro-reflector (not shown in the drawings) mounted atop beacon 24 or on its supporting column 26 if desired, comprising groups of three perpendicular planes of metal screen or the like, intersecting at concave corners to form conventional radar reflector surfaces.

As shown in FIG. 2, the interior cavity of sensor unit 14 is provided with an open bottom exposed directly to the underlying sea water. This open bottom of the internal cavity is highly useful when an oil slick has coated the interior walls of the hull 22, when detergents must be sprayed or sluiced within the internal cavity and over the exterior of sensor unit 14 in order to cleanse it of residual oil to avoid contamination of the local water surface around sensor unit 14 during subsequent monitoring operations. By this means convenient and ready access is provided for internal and external cleaning of the unit, after which it may be again deployed on station to report the arrival of new floating surface contaminants.

Since the foregoing description and drawings are merely illustrative, the scope of the invention has been broadly stated herein and it should be liberally interpreted so as to obtain the benefit of all equivalents to which the invention is fairly entitled.

What is claimed is:

1. Monitoring apparatus for sensing the presence of films of floating petroleum and other floating material on the free surface of a body of water comprising:

A. a monitoring unit capable of being deployed partially immersed beneath the surface of the body of water at a predetermined position enclosing a monitoring cavity overlying and shielding from external radiation a monitored portion of said free surface, said monitored portion extending contiguously through at least two portals to form a continuous subportion of said free surface and incorporating B. a broadband source of radiant energy positioned in the monitoring cavity and directed toward the free surface of the body of water, C. a filter in the monitoring cavity positioned in optical alignment to receive radiant energy which has been emitted by the source incident upon and reflected from the free surface of the body of water, said filter having an infrared passband in a spectral wavelength region for which floating foreign material on the free surface of the body of water possesses different infrared absorption-reflectance characteristics from those of the free surface of a substantially pure body of water on which such floating materials are not present, D. an infrared radiation detector positioned in the monitoring cavity to receive infrared radiation passed by the filter, E. a warning system connected to the detector and producing a warning signal in response to the absorption-reflectance characteristics of foreign materials floating on the free surface of the body of water upon radiation passing through the filter and received by the detector, F. and a source of energy providing the power required to operate the radiation source and the detector and warning system circuitry.

2. Monitoring apparatus for sensing the presence of films of floating petroleum and other floating materials on the surface of a body of water comprising:
   A. a floating monitoring unit capable of being deployed on the surface of the body of water at a predetermined position and incorporating a buoyant hollow hull portion enclosing an internal monitoring cavity concavely facing and shielding a monitored portion of the free surface of the body of water from external radiation,
   B. means forming an entrance portal and an exit portal both connecting the internal cavity with the external portion of the surrounding body of water on which the buoyant hull portion is afloat, said monitored free surface portion thereby extending contiguously through at least said two portals to form a continuous subportion of said free surface,
   C. a broadband source of emitted radiant energy positioned in the monitoring cavity and directed toward the shielded monitored free surface portion of the body of water within the internal cavity,
   D. a filter positioned in the cavity in optical alignment to receive radiant energy which has been emitted by the source and then reflected from the shielded monitored free surface portion of the body of water within the internal cavity, and having an infrared passband in the spectral wavelength region for which floating foreign material on the free surface of the body of water possesses different absorption-reflectance characteristics from those of the free surface of a substantially pure body of water on which such floating materials are not present,
   E. a radiation detector positioned in optical alignment in the cavity to receive reflected radiation passed by the filter,
   F. a warning system connected to the detector and producing a warning signal in response to the presence of radiation reflected by foreign materials floating on the free surface of a body of water within the internal cavity passing through the filter and received by the detector,
   G. and a source of energy providing the power required to operate the radiation source and the detector and warning system circuitry.

3. The apparatus defined in claim 1, further including a telemetry transmitter actuated by an output warning signal produced by the warning system, and a telemetry receiver connected to produce a warning indication in response to information transmitted by the telemetry receiver.

4. The apparatus defined in claim 1 wherein the source of energy includes solar cells mounted on the sensor unit exposed to incident solar radiation, connected to storage batteries carried by the sensor unit.

5. The apparatus defined in claim 1 wherein the warning signal produced by the warning system is a high intensity flashing light signal.

6. The apparatus defined in claim 1 wherein the warning signal produced by the warning system is an audible sonic warning signal.

7. The apparatus defined in claim 3, including a plurality of said floating sensor units each including a telemetry transmitter constructed to emit different pulse coded signals when actuated, whereby decoding circuits in the telemetry receiver are enabled to identify the floating sensor unit emitting a warning information transmission.

8. The method of sensing the presence of foreign matter floating on the free surface of a body of water comprising the steps of:
   A. shielding from external radiation a monitored portion of said free surface enclosed within a monitoring cavity and extending contiguously through at least two portals to form a continuous subportion of said free surface,
   B. directing infrared radiation toward the monitored portion of said free surface
   C. receiving at a first infrared detector positioned in said cavity infrared radiation redirected by said free surface both by specular reflection and by back-scatter,
   D. absorbing predetermined infrared radiation wavebands at a filter interposed in said cavity in optical alignment before said detector and having a passband encompassing infrared radiation wavelengths for which floating foreign material on the free surface possesses different infrared absorption-reflectance characteristics from those of the free surface itself when such foreign material is not present,
   E. and converting a variation in the output signal of said first detector produced in response to changes in infrared radiation intensity incident on the detector into a warning signal.

9. The method defined in claim 8 including the simultaneous steps of receiving radiation at a second comparison detector in said cavity exposed directly to a portion of the same radiation before it reaches the free surface, and balancing the output signals of the two detectors against each other to maximize the influence of infrared reflectance variations produced at the free surface by foreign materials floating thereon upon the output signal from said first detector.